June 26, 1951 — A. COUTANT ET AL — 2,558,605

APPARATUS FOR PRINTING COMPOSITE FILMS

Filed Oct. 1, 1946

Patented June 26, 1951

2,558,605

UNITED STATES PATENT OFFICE 2,558,605

APPARATUS FOR PRINTING COMPOSITE FILMS

André Coutant and Jacques Mathot, Paris, France

Application October 1, 1946, Serial No. 700,404
In France December 13, 1945

3 Claims. (Cl. 88—24)

In the production of faked films one is frequently led to use at least two films and to print said films alternately on a bank film while so combining the registering that once said film has been exposed and developed it will exactly give the desired scene, thus providing a synthesis obtained by the addition of several wholly different documents.

For instance, in order to represent a moving picture-house with the audience during the flashing of moving pictures it is necessary:

1. To shoot the house with the audience and the blank screen;
2. To shoot the moving picture the audience is supposed to look at on the screen;
3. To print a film from the two preceding documents while registering them in such manner that the film print shall exactly represent both the scene of an audience looking at moving pictures and the latter themselves.

Although this method is very simple in its principle, considerable difficulties are encountered in its performance, notably in locating the second document and registering it exactly with respect to the first one so that a complete film shall be obtained at printing.

The apparatus according to this invention, which is intended to do away with the inconveniences of prior apparatus, makes it possible in full daylight, as the printing is carried out on the blank film, to check the register of the document flashed on a translucid screen that is backed with the complementary document which then serves as registration-checking mask.

The image thus projected upon a translucid screen is taken again by an objective and projected once more upon a check screen, whereby the operator is given an easy control upon his work.

It will be understood that after (a) the document flashed, (b) the partially printed blank film and (c) the mask film associated with the translucid screen have been run through once there only remains to repeat the same operation with the two now permuted complementary documents, of which the once checking-mask document becomes the printing document whilst the former printing document becomes the checking-mask document.

It will be realized easily that intermittent vision on a translucid screen backed with a mask film considerably facilitates a work which up to the present had to be performed in the dark by tedious, inaccurate and unsuitable means.

A particular embodiment of this invention is shown by way of example in the appended drawing.

Figure 1:
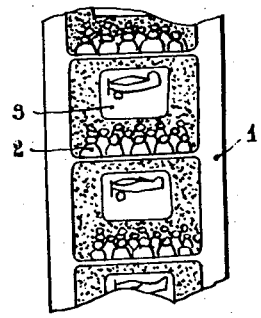
Figure 1 illustrates the film to be obtained.
Figure 2:
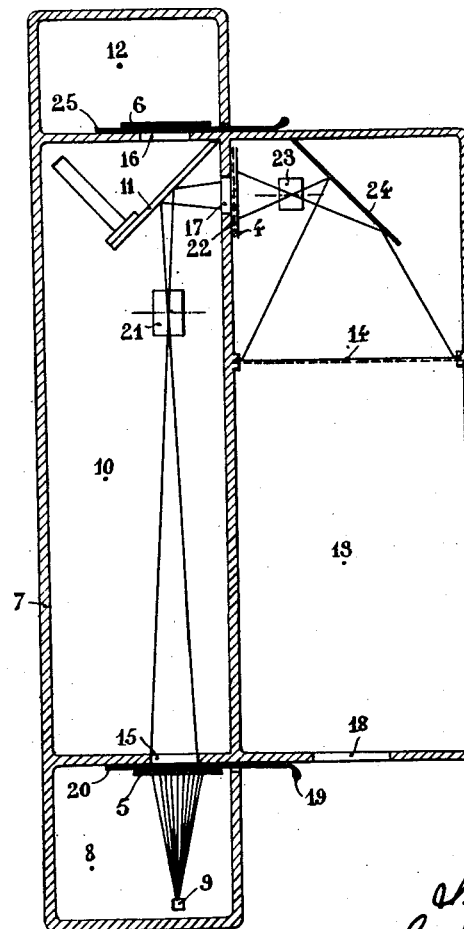
Figure 2 represents a printing machine in diagrammatic horizontal sectional view.

On Figure 2, 7 shows a dark chamber divided by parallel partitions into three compartments 8, 10, 12, and in which the documentary films 5 and 4 and the film 6, sensitive to the light, are guided according to vertical directions opposite apertures 15, 17 and 16, respectively, adjusted in the partitions of this dark chamber, the planes of the films 5 and 6 being parallel to each other, and that of the film 4 being perpendicular to the previous ones.

9 shows a light-source arranged so as to show successive images of the film 5 on the film 6 through the aperture 15, a lens 21 and the aperture 16, which are placed according to a same axis.

Between the aperture 17 and the film 4 is placed a translucid screen 22. A movable mirror 11 is arranged in the bisector plane of the angle formed by the said film and said screen; this mirror is actuated with a movement so that when in a position it lets pass directly towards the film 6 the pencil of rays transmitted through the objective 21 and that when in another position it intercepts this pencil of rays and reflects it towards the screen 22. This result may be obtained simply by rotating the mirror 11 about a perpendicular axis to said bisector plane.

The views of the film 5 shown through the aperture 16 are partly masked by a mask 20 which the operator may move as desired for instance by means of a handle 19. The masking or framing effect produced by this mask may be controlled by the operator each time the pencil of rays is reflected towards the screen 11 and the film 4 juxtaposed to same. For this purpose the dark chamber 7 includes a side compartment 13 in which are placed a semi-transparent screen 14, an objective 23 and a mirror 24; the screen 14 is placed so as to be easily visible by the operator even in full daylight, through an aperture 18 of the compartment 13; the objective 23 is placed opposite the aperture 17, and the mirror is arranged so as to reflect towards the screen 14 the enlarged image of the successive views of the film 4 which this objective 23 flashes when said film 4 receives the pencil of rays coming from the light-source 9, passing through the film 5, the mask 20, the objective 21 and reflected by the mirror 11.

Subsequently an additional mask 25 may be placed between the aperture 16 and the film 6, and be shifted as desired by the hand of the operator by means of a suitable driving-gear.

The printing machine 7 operates as follows:

For the obtainment of the film 1 by starting from the pictures 2 and 3 which cannot be printed simultaneously, the film 5 which carries the scene 3 is placed in the projection chamber 8. The light source 9 illuminates the document which is projected to the desired scale through gate 15, chamber 10 and lens 21 upon the rotary silvered shutter 11 whereby the light rays are alternately allowed to print the blank film 6 in the dark room 12 through gate 16 and reflected through gate 17 onto the translucid screen 22 backed with the film 4 on which the scene 2 is printed. Said film 4 thus acts as a register-checking mask, and the luminous image formed on the translucid screen 22 is projected together with that of the backing film 4 through the magnifying lens 23 upon mirror 24 by which both are reflected upon the translucent screen 14 to be viewed by the operator through aperture 18.

It follows that it is only necessary for the obtainment of a satisfactory registration to manipulate the mask 20 while watching the result through aperture 18.

When all the images of the film 5 will thus have been registered on the film 6, the three films 4, 5, 6 will be unwound, rewound and replaced, the positions of the two first films being interchanged, the mask 20 will be replaced by a suitable additional mask, and the operations previously described will be repeated so as to register on the film 6 the portions of the film 4 which this new mask will leave visible. The control and the adjusting of this mask will then be carried out by the operator as has been explained above.

Said mask 20 which can be actuated by means of a knob 19 may be a suitably cut metal sheet or a transparent plate with opaque portions; contingently, it can be replaced by a mask film designed to secure automatic registering, in which case it should be fed through together with film 5; similarly and if necessary the mask 25 can perform the same action.

If films 4 and 5 are negatives, the film 6 once exposed and developed will be a positive from which if found satisfactory a negative is copied to serve for the copying of any desired member of positives 1.

We claim:

1. A machine for the obtainment of faked films printed on a blank film from complementary portions of pictures recorded on two separate films by successively projecting images of said portions of said pictures upon said blank film in such a manner that the successively exposed areas of the latter will complement each other to subsequently form a unitary picture comprising means to run the two separate films in timed relation with said blank film, means to project said portions of pictures recorded on one of the two separate films directly upon the blank film, masking means to limit the projected portions of said film, an angularly set reflector movable crosswise of the path of the projected light adapted to deflect said light intermittently sidewise to project an image of said first separate film upon the other separate film, and means to modify the position of said first separate film so that its image on the other separate film completes the pictures of said film.

2. A machine for the printing of faked films according to claim 1 comprising a first camera containing the said means to project portions of the pictures recorded on one of said separate films upon the said blank film, the said separate film, the said blank film and the said angularly set reflector, a second camera adjacent to the first-mentioned one, a partition between the two cameras with a window therein, means to reel the other separate film across said window in synchronism with the first separate film and the blank film in such a manner that the said reflector will alternatingly project images from the first separate film upon the said other separate film, said second camera being provided in one of its outer walls with a peep window through which the second separate film can be observed and means whereby said means adapted to modify the position of said separate film so that its image on the other separate film complement the pictures on said film can be controlled from the outside.

3. A machine according to claim 2 wherein the second camera is provided with a translucent screen that can be observed through the peep window and means thereby an image of that separate film which is reeled across the window in the partition between the two cameras can be projected upon said translucent screen.

ANDRÉ COUTANT.
JACQUES MATHOT.

REFERENCES CITED

The following references are of record in the file of this patent:

UNITED STATES PATENTS

| Number | Name | Date |
|---|---|---|
| 1,269,061 | Dawn | June 11, 1918 |
| 1,275,249 | Hlavaty | Aug. 13, 1918 |
| 1,503,731 | Walker | Aug. 5, 1924 |
| 1,510,155 | Nelson | Sept. 30, 1924 |
| 1,543,065 | Douglass | June 23, 1925 |
| 1,869,819 | Mammes | Aug. 2, 1932 |
| 1,894,265 | Chretien | Jan. 17, 1933 |
| 2,012,352 | Rustings | Aug. 27, 1935 |